United States Patent [19]
Dennison

[11] Patent Number: 4,816,642
[45] Date of Patent: Mar. 28, 1989

[54] HOT MELT ADHESIVE APPLICATOR AND TEMPERATURE CONTROL CIRCUIT THEREFOR

[75] Inventor: Richard L. Dennison, Burnsville, Minn.

[73] Assignee: Minnesota Mining and Manufacturing Company, St. Paul, Minn.

[21] Appl. No.: 67,713

[22] Filed: Jun. 26, 1987

[51] Int. Cl.⁴ .............................................. H05B 1/02
[52] U.S. Cl. ..................................... 219/230; 219/501; 219/497; 330/298; 330/275; 323/236; 307/540
[58] Field of Search ............... 219/501, 503, 497, 499, 219/494, 210, 211; 323/235, 236; 307/540; 330/298, 275, 271

[56] References Cited

U.S. PATENT DOCUMENTS

| | | | |
|---|---|---|---|
| 3,588,530 | 6/1971 | Largan | 330/252 |
| 4,096,973 | 6/1978 | Checko | 219/421 |
| 4,119,801 | 10/1978 | Jacobson | 330/252 |
| 4,345,141 | 8/1982 | Little | 219/497 |
| 4,413,255 | 11/1983 | Cohen et al. | 219/421 |
| 4,478,181 | 10/1984 | Kikuchi et al. | 219/492 |
| 4,495,405 | 1/1985 | Foster | 219/501 |
| 4,558,286 | 12/1985 | Neidorff | 330/252 |
| 4,564,749 | 1/1986 | Ishima | 219/497 |
| 4,626,663 | 12/1986 | Tateda | 219/497 |

OTHER PUBLICATIONS

IBM-Disclosure Bulletin—Differential Amplifier with Variable Clipping Levels—vol. 13 No. 9 (Feb-1971).
Zero Voltage Switches, CA3059, CA3079, 6 pages, 1977, Motorola Semiconductors, Phoenix, Ariz. 85036.

*Primary Examiner*—M. H. Paschall
*Attorney, Agent, or Firm*—Donald M. Sell; Walter N. Kirn; Robert L. Marben

[57] ABSTRACT

A hot melt adhesive applicator operable at a number of selected temperatures having a portion of the circuitry for control of the applicator temperature at a point remote from the applicator body. The remotely located circuitry employs a differential amplifier and a zero crossing detector for controlling the operation of a triac which, when turned on, increases the temperature at the applicator. The operational amplifier is protected by a clamping circuit from receiving a signal, when a temperature setting is changed from a high to a low setting, that would otherwise cause the differential amplifier to provide an output required for turning on the triac which would cause a run away condition to exist.

8 Claims, 2 Drawing Sheets

HOT MELT ADHESIVE APPLICATOR AND TEMPERATURE CONTROL CIRCUIT THEREFOR

FIELD OF THE INVENTION

The invention presented herein relates to hot melt adhesive applicators and, in particular, to the means providing control of the operating temperatures of the applicator.

BACKGROUND OF THE INVENTION

Hot melt adhesive applicators currently available have their heating elements powered from a commercial alternating current source with control of the temperature of the heat block to melt the adhesive being obtained by the use of a bimetal-type thermostatic switch. The thermostatic switch is mounted within the applicator body to respond to the temperature of the heat block. While temperature adjustable bimetal-type thermostats are available for higher power applications (above about three amperes), they are large and tend to be expensive. Also, adjustment accuracy is poor. For these reasons, hot melt adhesive applicators that use bimetal-type thermostatic temperature control are almost entirely single temperature devices. The typical approach for a multi-temperature applicator is to have two or more single temperature thermostats that are switch selectable. Even then a bimetal-type thermostatic switch does not provide very close control of the nozzle temperature. A selected temperature setting can be expected to typically vary $\pm 8.5°$ C. to $\pm 14°$ C. There is need for a temperature control system that has a much reduced swing about a selected temperature setting, since a smaller temperature swing will allow use of a higher wattage heating element to reduce the time needed to attain a desired temperature allowing more adhesive to be applied by an applicator for a given time period. A smaller temperature swing will also produce more consistent and desirable flow rates for an adhesive to provide a desired application result. It is also desirable that the selection of various temperature settings be carried out in a manner that is repeatable.

A triac heater control integrated circuit (IC) is shown in application literature published by the Motorola, Inc., Phoenix, Ariz. relating to Motorola's type CA 3079 zero voltage switches. This circuitry is suitable for control of temperature at one setting, but can present an uncontrolled mode of operation when it is desired to control the temperature maintained by operation of a heater element at more than one level. If the control circuitry is positioned for control at one temperature level and the control level is changed to a temperature at a lower level that is sufficient to cause the voltage at the positive input of a differential amplifier to go sufficiently negative relative to the voltage at the negative input, the differential amplifier operates to provide a signal that causes the triac or thyristor of the circuitry, which controls the flow of current through a load (such as a heating element) to be turned on and remain on and thus cause a run away condition.

A Motorola type CA 3059 zero voltage switch is available and is like the CA 3079 but with a protection circuit provided. The protection circuit serves to remove the drive current from the triac or thyristor used with the CA 3059 device if the sensor used with the CA 3059 opens or shorts. The application literature places a restriction on employment of the protection circuit. It requires the temperature sensing element and an associated resistor, which with the sensing element provides a voltage divider, to have resistance values between 2,000 and 100,000 ohms. This restriction places a limit on the range of temperature settings that can be used. For example, if temperature control is desired between about 265° C. and 99° C. and a $\phi$,000 ohm (at 25° C.) thermistor is selected as the sensor to take advantage of the high end of the resistive limit, the thermistor will present a resistance around 75 ohms when the control circuit is set to control at 265° C. causing the current drawn by the thermistor circuit to be too large for the power supply provided as a part of the device to maintain a workable output voltage level.

SUMMARY OF THE INVENTION

The invention presented herein overcomes the problems associated with the prior art teachings for using a zero voltage switch, which includes a differential amplifier to control the operation of a triac connected with an electrical heating element and wherein a wide range of temperature control is desired. The invention presented herein also provides for control of a selected temperature to within $\pm 4°$ C.

The invention provides an improvement to a semiconductor control circuit that has a differential amplifier with two inputs wherein the differential amplifier provides an output signal when one of the two inputs is positive or is too negative with respect to the other input, the improvement including a clamping circuit connected to the one input of the differential amplifier for supplying a voltage to the one input which prevents the one input from being too negative relative to the other of the two inputs to cause the differential amplifier to provide an output signal.

The invention also provides an improved semiconductor temperature control circuit that has an electronic switch connected in series with a heater element and a differential amplifier with two inputs, one of which receives an input signal from a voltage divider that includes a temperature responsive sensing element for sensing a temperature that is determined by the energization of the heater element and wherein the differential amplifier provides an output signal when the input connected to the voltage divider is positive or is too negative with respect to the other input and an output signal from the differential amplifier is required for conduction of the electronic switch, the improvement including an adjustable or selectable resistance as a part of the voltage divider; and a clamping circuit connected to the one input of the differential amplifier that receives an input from the voltage divider, said clamping circuit supplying a voltage to the one input of the differential amplifier which prevents such input from being too negative relative to the other of the two inputs to cause the operational amplifier to provide an output signal.

The clamping circuit of the improved semiconductor control circuit and the improved semiconductor temperature control circuit can include a voltage divider and a diode wherein the voltage divider provides a voltage signal that is applied to the one input of the differential amplifier via the diode when such circuits are energized.

A further improvement includes the use of two thermistors with similar response curves connected in series to provide the temperature responsive sensing element for the control circuit. Two thermistors provide a a more precise (better accuracy for a population of applicators) selected temperature than is provided if a single sensing element were used.

Another aspect of the invention is embodied in an A.C. energized hot melt adhesive applicator that has an electrically energized heating element and a temperature responsive sensing element disposed in the body of the applicator, the applicator including a semiconductor temperature control circuit adapted for connection to an A.C. source and connected to the electrically energized heating element and temperature responsive sensing element via conductors of a length sufficient to position the semiconductor control circuit away from the body of the applicator to provide room for a heat sink of the size needed for a semiconductor circuit having a triac through which the current for the heating element of the applicator flows. A further aspect of the invention is the use of the improved semiconductor temperature control circuit as the control circuit for the A.C. energized hot melt adhesive applicator.

BRIEF DESCRIPTION OF THE DRAWINGS

The novel features and advantages of the present invention will become more apparent to those skilled in the art upon consideration of the following detailed description which refers to the accompanying drawings wherein.

DETAILED DESCRIPTION

Figure 1:
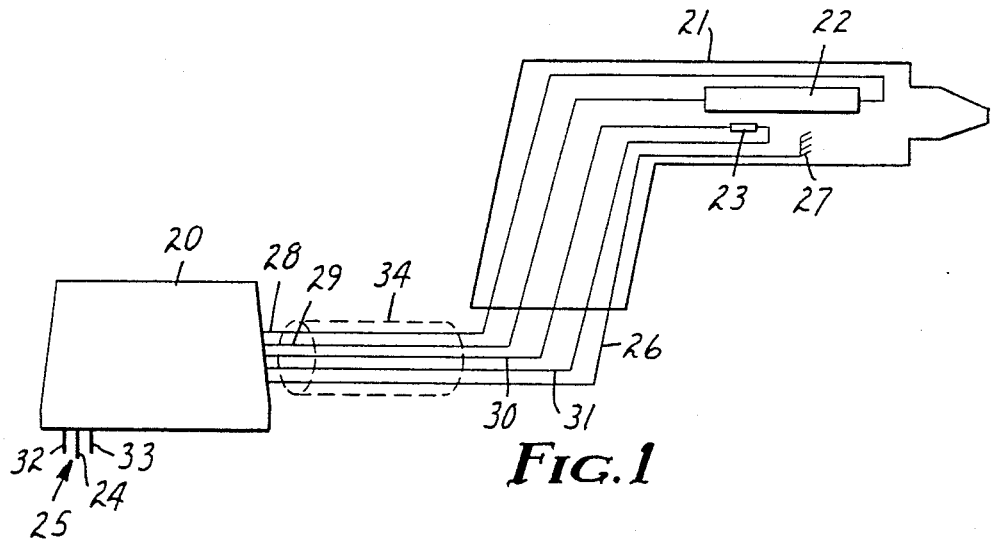
FIG. 1 is a partial diagrammatic showing of a hot melt adhesive applicator embodying the invention.

Referring to FIG. 1 of the drawings, the invention is embodied in an A.C. energized hot melt adhesive applicator that is diagrammatically shown where a semiconductor temperature control circuit for the applicator is contained within a housing 20 located at a point that is remote from the applicator body 21. The control circuit within the housing 20 is connected to an electrically energized heating element 22, and a temperature responsive sensing element 23 located within the applicator body 21. A three prong A.C. power connector 25 is provided at the housing 20 and has two of its prongs 32 and 33 connected directly to the control circuit within the housing 20. The electrically neutral prong 24 of the three prong A.C. power connector 25 is connected, via a conductor 26, directly to the heat block (not shown) of the applicator as indicated by the connection 27 made within the applicator body. Two conductors 28 and 29 are used to connect the heating element 22 to the control circuit portion in the housing 20 with two conductors 30 and 31 used to connect with the temperature responsive sensing element 23 to such control circuit portion. The sensing element 23 has a negative temperature coefficient of resistance. Conductor 26, which makes the connection at one end with the heat block in the applicator at 27, extends to and through the housing 20 and has its other end connected to the electrically neutral prong 24 of connector 25. The conductors 26 and 28-31 are insulated from one another and are enclosed along their full length in a rubber or PVC cable jacket. A portion of such jacket is indicated by the dotted line portion 34. The arrangement just described makes it possible to use a semiconductor temperature control circuit for control of the temperature of the heat block in a hot melt adhesive applicator.

Figure 2:
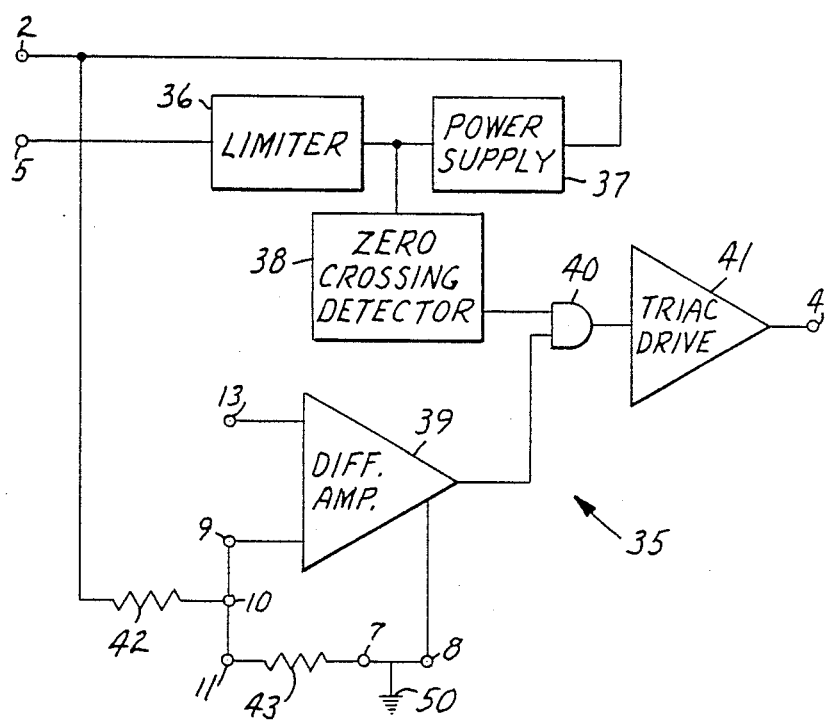
FIG. 2 is a block diagram showing of a zero voltage switch used in the applicator of FIG. 1.
Figure 3:
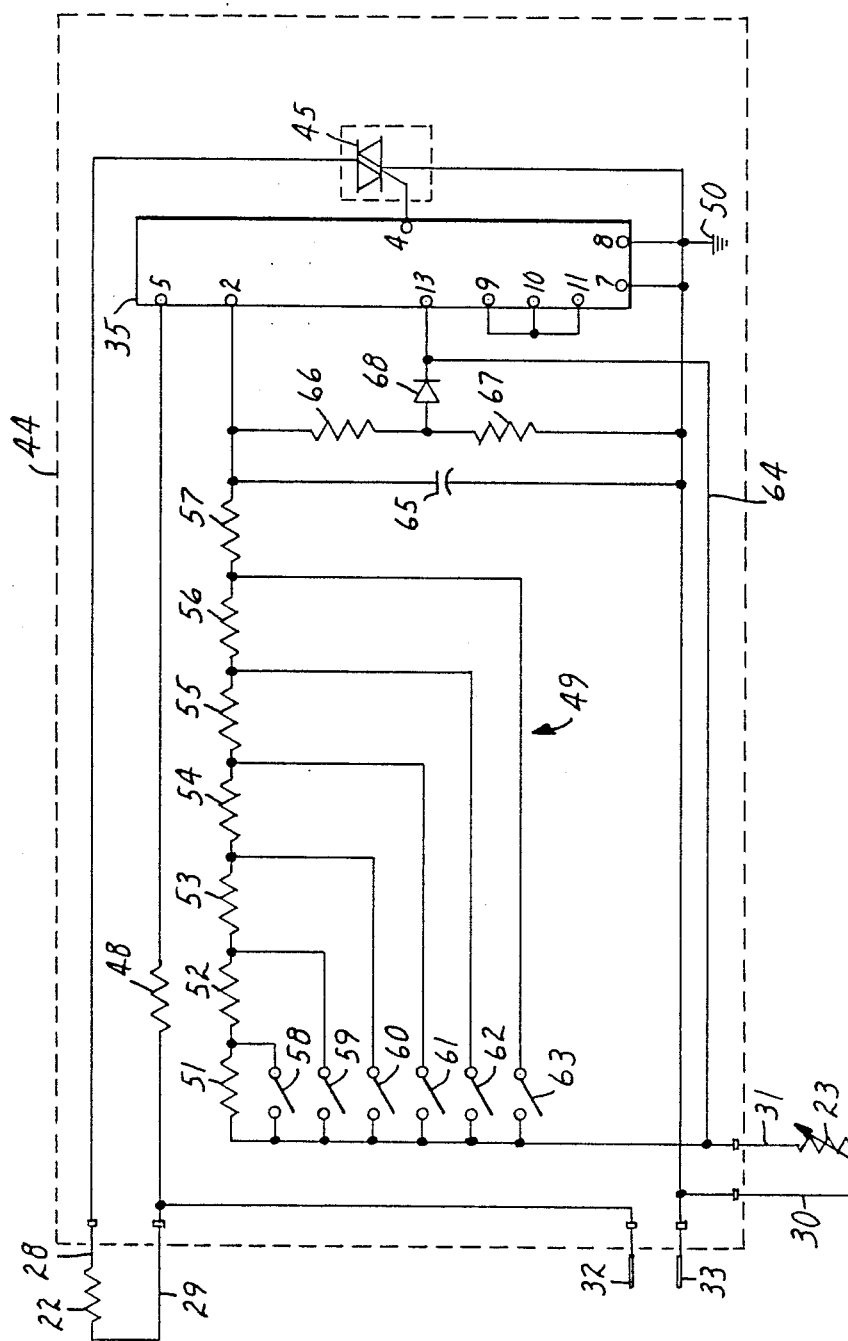
FIG. 3 is a schematic of the control circuitry for the applicator of FIG. 1.

Referring to FIG. 2, circuitry for a zero voltage switch 35, that is used in the circuitry of FIG. 3, is shown in block diagram form. It is commercially available under the designation CA 3079 from Motorola, Inc., P.O. Box 20912, Phoenix, Ariz. 85036. The connecting points indicated by reference numerals 2, 4, 5, 7-11 and 13 correspond to the reference numerals used in the application literature published by Motorola, Inc. for the CA 3079 zero voltage switch. The zero voltage switch circuitry of FIG. 2 includes a limiter 36 and power supply 37 that allows the circuitry to be operated directly from an A.C. source. The A.C. source is applied between connecting point 5 for limiter 36 and ground at 50 to which connecting points 7 and 8 are connected. The output of power supply 37 provides about 6.5 volts D.C. to connecting point 2. The circuitry of FIG. 2 also includes a zero crossing detector 38, a differential amplifier 39, an AND circuit 40, a triac drive 41 and two resistors 42 and 43. The zero crossing detector is connected between one input of the AND circuit 40 and the connection common to the limiter 36 and power supply 37 serving to provide a signal at each zero crossing of the A.C. supply. The differential amplifier 39 has its output connected to a second input of the AND circuit 40 to supply a signal to the AND circuit whenever the positive input of the differential amplifier, which connected with connection point 13, is positive relative to the negative input of the operational amplifier. The negative input of operational amplifier 39 has a positive voltage presented to it via the connecting point 9, which is also connected to connecting points 10 and 11. Resistors 42 and 43 present a resistance of 10 K and 9.6 K ohms, respectively, and are connected in series between ground 50 and the output 2 of the power supply 37 to form a voltage divider. The positive voltage present across resistor 43 is presented to the negative input of the differential amplifier 39.

Turning to FIG. 3, circuitry is shown which includes a circuit portion that can be used for the control circuitry positioned within the housing 20 for the hot melt adhesive applicator described in connection with FIG. 1. The portion shown within the dotted line 44 can be provided on a printed circuit board for placement within the housing 20. The circuitry includes a zero voltage circuit 35, which is in accordance with the circuitry shown in FIG. 2. Reference numerals used in FIGS. 1 and 2 are used in FIG. 3 to identify the same or corresponding components or connecting points. The small rectangles appearing within the dotted line 44 identify connecting points made between the circuit board and circuit components located outside the housing 11.

The output 4 of the triac drive 41 of the zero voltage circuit 35 is used to control the operation of an electronic switch. In the case of the circuitry of FIG. 3, output 4 is connected to the gate of a triac (bidirectional triode thyristor) 45, which is an electronic switch. Conductor 28 connects one side of the triac 45 to one end of the electrically energized heating element 22 located within the applicator body 21, as shown in FIG. 1. The other side of the triac 45 is connected to the ground reference 50 of the circuit, which connects to the prong 33 of the A.C. connector 25 (FIG. 1). The prong 32 of the A.C. connector is connected to the conductor 29 which is connected to the other end of the heating element 22. Accordingly, with the A.C. connector connected to an A.C. source, a current path is established that includes the heating element 22 and the triac 45 with the heating element 22 energized for a half cycle of the A.C. source provided the triac has received a gating pulse from the output 4 of the triac drive 41, which will occur at each zero crossing of the A.C. source, and provided the differential amplifier of circuit 35 is also then providing an output signal to the AND circuit 40 of the circuit 35.

The prong 32 of the A.C. connector is also connected via a current limiting resistor 48 to the connecting point 5 to supply A.C. to the power supply 37 (FIG. 2) of circuit 35 via the limiter 36. The output 2 of the power supply 37 is connected to a circuit portion, generally indicated at 49, that presents a resistance which via the conductor 31 is connected in series with the temperature responsive sensing element 23 that is located within the applicator body 21 (FIG. 1). The other end of the sensing element 23 is connected via conductor 30 to circuit ground reference 50 and prong 33 of the A.C. connector. The connection common to circuit portion 49 and sensing element 23 is connected via a conductor 64 to the connecting point 13, which is the positive input for the differential amplifier 39 of zero switching circuit 35. The power supply 37 of the zero voltage switch 35, described in connection with FIG. 2, does not have an output filter capacitor. A capacitor 65 is connected between the output 2 of the power supply 37 and ground 50 to provide such an output filter capacitor.

Viewing the circuit portion 49 as a single resistor, the circuitry of FIG. 3 described up to this point will operate in accordance with the functional block diagram shown in the application literature (DS 9450) provided for the Motorola, Inc. CA 3079 zero voltage switch. When the resistance presented by the sensing element 23, which has a negative temperature coefficient, is larger than the resistance presented by the circuit portion 49, a voltage signal is presented to the positive input 13 of the operational amplifier 39 which causes the input 13 to be more positive than the positive voltage provided at the negative input 9 of the operational amplifier. This causes the operational amplifier 39 to provide an input signal to the AND circuit 40 which, when the zero crossing detector 38 produces a pulse at the beginning of each half cycle of the A.C. input to the circuitry, produces an output signal that causes the triac drive 41 to operate to turn the triac 45 on. The triac 45 is thus turned on every half cycle of the A.C. until the heat generated due to current flow through the heating element 22 causes the temperature sensed by the sensing element 23 to rise to cause the resistance of the sensing element 23 to be reduced to a point where the voltage present across sensing element 23 is no longer more positive than the voltage provided to the negative input 9 of the operational amplifier 39. The output from the operational amplifier 39 for the AND circuit 40 is, therefore, terminated so the triac 45 remains off for each half cycle of the A.C. for as long as such condition exists. As the temperature sensed by the sensing element 23 drops (since current flow through the heating element ceases when the triac is off) the resistance of the sensing element 23 increases causing the signal to the input 13 of the operational amplifier to increase sufficiently to again provide an output which results in the triac 45 being turned on at the beginning of each half cycle causing the heater element to be energized to raise the temperature sensed by the sensing element 23 to a point where the triac is again turned off.

Considering the circuit portion 49, seven resistors 51-57 are shown connected in series between the connecting point 2 and one end of the conductor 31, with six single pole switches 58-63 used to selectively short out one, two, three, four, five or six of the seven resistors 51-57, for purposes of selecting seven possible temperature control points. One side of each switch is connected to the connection common to the circuit portion 49 and the sensing element 23. Switch 58 has its other side connected to the connection common to resistors 51 and 52. Switches 59-63 are similarly connected to the connections common to resistors 52 and 53; 53 and 54; 54 and 55; and 56 and 57, respectively.

If an effort were made to use a resistive arrangement as shown in FIG. 3, using the circuitry described by the published literature for the CA 3079, to provide for seven temperature settings, and if the temperature control were operated to maintain one temperature level and a lower level was then selected, the voltage present across the sensing element 23 would be low enough, due to the additional series resistance (resistors 51 through 57) introduced in the circuit portion 49 for the lower temperature setting, to cause the input 13 of the operational amplifier 39 to be sufficiently negative with respect to the negative input 9 to cause the operational amplifier to produce an output signal to cause the triac 45 to be turned on. This, of course, only causes the temperature sensed by the sensing element 23 to rise, lowering its resistance, to make input 13 of the operational amplifier even more negative with respect to the negative input 9 to cause a run away condition to exist. A circuit as described is, therefore, not usable when more than one temperature control point is to be used and a temperature control point selection is made for a lower temperature control point after the control has been operating at a higher temperature control point.

The operating problem just described is solved by the use of additional circuitry which functions as a clamping circuit serving to keep the positive input 13 of the operational amplifier 39 from going sufficiently negative with respect to the negative input 9 which, if allowed to occur, would, as described earlier, cause the operational amplifier 39 to provide an output that results in the triac 45 being turned on and remaining on. The additional circuitry includes two series connected resistors 66 and 67 which ae connected between the output 2 of the power supply 37 and ground 50 to provide a voltage divider plus a diode 68. The diode 68 has its anode connected to the connection common of resistors 66 and 67 and its cathode connected to input 13 for the differential amplifier. Other voltage clamping circuits can also be used to carry out the function of the additional circuitry described provided they do not load down the power supply for the zero voltage switch to cause its output to drop too low. One possible alternate clamping circuit is provided by replacing resistor 67 with a Zener diode. Resistor 66 and diode 68 would still be required. An external power supply must be used since the power supply provided as an integral part of the CA 3079 cannot supply enough current for a Zener diode.

With the use of the additional circuitry described, it is possible to use the circuitry of FIG. 3 for controlling the operating temperature of the hot melt adhesive applicator at a number of points without having a run away condition established when switching from operation at a high temperature to a low temperature. Even though such switching from a high to a low temperature setting introduces more resistance in the circuit portion 49 leg of the voltage divider, the voltage at the input 13 of the differential amplifier 39 is determined by the clamping circuit portion provided by resistors 66 and 67 plus the diode 68.

A control circuit using the circuit components and values, as set forth below, will provide operation from a 120 volt A.C. source for temperature control at the temperatures indicated, with switches 58–63 operated as indicated.

All switches off - 99° C.
Switch 58 closed - 127° C.
Switch 59 closed - 177° C.
Switch 60 closed - 196° C.
Switch 61 closed - 212° C.
Switch 62 closed - 238° C.
Switch 63 closed - 265° C.

| Component | Value or Type |
|---|---|
| Zero Voltage Switch 35 | CA 3079 (Motorola) |
| Triac | MOT Type, MAC 15-8 (120 V. A.C.) |
| Capacitor 65 | 220 μf @ 16 V. D.C. |
| Sensing Element 23 | 2 NTC Thermistors, each 500,000 ohm at 25° C. (Fenwal) |
| Heating Element 22 | 26 ohm Nichrome wire resistor (Steady State Operation) |
| Resistor 48 | Dale type CW-5-7.5K ohm |
| Resistor 51 | 51.1K ohm ±1%, ⅛ W. |
| Resistor 52 | 20.5K ohm ±1%, ⅛ W. |
| Resistor 53 | 2.26K ohm ±1%, ⅛ W. |
| Resistor 54 | 1.27K ohm ±1%, ⅛ W. |
| Resistor 55 | 1.10K ohm ±1%, ⅛ W. |
| Resistor 56 | 698 ohm ±1%, ⅛ W. |
| Resistor 57 | 1.13K ohm ±1%, ⅛ W. |
| Resistor 66 | 1.8K ohm ±5%, ¼ W. |
| Resistor 67 | 1.8K ohm ±5%, ¼ W. |
| Diode 68 | IN 4001 |
| Switches 51–57 | DIP Switch, 6 position (Grayhill Part No. 765B065RA) |

It will be noted in the component listing that two thermistors are used to provide the sensing element 23. While a single thermistor providing a resistance equal to the combined resistance of the two thermistors can be used, a smaller temperature variation over a population of applicators for a selected temperature control point is obtained by using two thermistors in place of a single thermistor. The two thermistors are matched to provide the least amount of deviation along their temperature versus resistance response curves. By using the two thermistors, control at a selected temperature is possible within ±4° C. over a population of applicators.

It should also be noted that while a potentiometer could be used to provide the various selected temperature control points, greater accuracy and repeatability is obtained by the use of the fixed resistors and switches as set forth in FIG. 3.

The circuitry of FIG. 3 has been described so the neutral side of the A.C. line will normally be connected to the circuit ground 50 (prong 33). This is not an absolute requirement provided the sensing element 23, which is positioned at the heating block (not shown) in the applicator body 21, is electrically insulated from the heating block along with the conductors in the immediate area of the sensing element. High temperature insulating tubing material having a wall thickness of 0.01 centimeters, which is available under the trademark "Kapton" owned by the E. I. duPont de Nemours and Company, Wilmington, Del. 19898, can be used to provide the desired insulation. The tubing described will tolerate the temperature environment that it will encounter. Under these conditions an applicator, made for the U.S. market, can be connected to a non-polarized power receptacle, even though the A.C. input could then be reversed causing the sensing element to be at A.C. line potential relative to the heating block. Use of the insulating tubing would be of similar value for an applicator made for the European market.

The particulars of the foregoing description are provided merely for purposes of illustration and are subject to a considerable latitude of modification without departing from the novel teachings disclosed therein. For example, while the control circuit set forth in the foregoing description uses a negative temperature coefficient thermistor for the sensing element 23, a positive temperature coefficient resistive element can be used for the sensing element 23. This, of course, requires an interchange of the positions in the circuitry for the sensing element 23 and the circuit portion 49 with all of the switches 58–63 being closed to obtain the lowest temperature control point and the highest temperature control point selected when all of the switches 58–63 are open. Selection of a PTC resistive element will, of course, require recalculation of the values of resistors 51–57 to obtain the desired temperature control points. Accordingly, the scope of this invention is intended to be limited only as defined in the appended claims, which should be accorded a breadth of interpretation consistent with this specification.

I claim:

1. An improved semiconductor control circuit that includes a differential amplifier with two inputs, the differential amplifier providing an output signal when one of the two inputs is positive or is too negative with respect to the other input and wherein use of the semiconductor control circuit requires means for providing a first d.c. voltage to the one input, the improvement including a clamping circuit connected to the one input of the differential amplifier to supply a second d.c. voltage to the one input which, whenever a first d.c. voltage is present, is effective to prevent the first d.c. voltage from causing the one input from being too negative relative to the other of the two inputs to cause the differential amplifier to provide an output signal and to allow a first d.c. voltage to the one input to cause said one input to be positive with respect to the other input to cause the differential amplifier to produce an output signal.

2. An improved semiconductor control circuit according to claim 1 wherein said clamping circuit includes a voltage divider and a diode wherein said voltage divider provides said second voltage when the semiconductor control circuit is energized, said diode connected between said voltage divider and the one input of the differential amplifier to apply said second voltage to the one input of the differential amplifier.

3. An improved semiconductor temperature control circuit that has an electronic switch connected in series with a heater element, a differential amplifier with two inputs, one of which receives a first d.c. input signal from a voltage divider that includes a temperature responsive element for sensing a temperature that is determined by the energization of the heater element and wherein the differential amplifier provides an output signal when the input connected to the voltage divider is positive or is too negative with respect to the other input and an output signal from the differential amplifier is operatively applied for controlling conduction of the electronic switch, the improvement including:

an adjustable resistance as a part of the voltage divider; and a clamping circuit connected to the one input of the differential amplifier that receives the first d.c. input signal from the voltage divider, said clamping circuit supplying a second d.c. input signal to the one input of the differential amplifier, whenever the first d.c. input signal from the voltage divider is present, which is effective to prevent the first d.c. input signal from causing such input from being too negative relative to the other of the two inputs to cause the differential amplifier to provide an output signal and to allow the first d.c. input signal from the voltage divider to cause said one input to be positive with respect to the other input to cause the differential amplifier to provide an output signal.

4. An improved semiconductor temperature control circuit according to claim 3 wherein said clamping circuit includes a diode and a voltage divider which provide said second input signal when the semiconductor temperature control circuit is energized, said diode connected between said voltage divider included in said clamping circuit and said one input of the differential amplifier to apply said second input signal supplied by said clamping circuit to the differential amplifier.

5. An improved semiconductor temperature control circuit according to claim 3 wherein said adjustable resistance includes a plurality of resistors connected in series plus one switch connected across at least one of said resistors for completion of a short circuit when closed and at least one other switch connected across a combination of said one of said resistors and at least one additional one of said resistors for completion of a short circuit when closed whereby with all of said switches open, all of said plurality of resistors determine a temperature control point for the control circuit with a higher temperature control point being determined upon closure of each of said switches, said voltage divider, in the absence of said clamping circuit, providing a first d.c. input signal at the one input of the differential amplifier that is too negative relative to the other of the two inputs to cause the operational amplifier to provide an output signal when the control circuit is operating at a temperature control point and one of said switches is moved from a closed to an open position.

6. An A.C. energized hot melt adhesive applicator that has a heating element and a temperature responsive sensing element disposed within the body of the applicator, the applicator including:

a semiconductor temperature control circuit;

a housing in which said semiconductor temperature control circuit is positioned;

conductors connecting said semiconductor control circuit with the heating element and the temperature sensing element to position said semiconductor control circuit away from the body of the applicator;

said semiconductor temperature control circuit including:
(a) an electronic switch;
(b) a heater element connected in series with said electronic switch;
(c) a voltage divider that includes an adjustable resistance and a temperature responsive element for sensing a temperature that is determined by the energization of the heater element, said voltage divider providing a first d.c. voltage signal;
(d) a differential amplifier having two inputs, one of which is connected for receiving said first d.c. voltage signal from said voltage divider and an output operatively applied to said electronic switch with an output signal being required at said output before said electronic switch can conduct and wherein said differential amplifier provides an output signal when said one input connected to said voltage divider is positive or is too negative with respect to the other input; and
(e) a clamping circuit connected to said one input of said differential amplifier which is connected to said voltage divider, said clamping circuit supplying a second d.c. voltage signal to said one input of the differential amplifier, whenever said first d.c. voltage signal is present, which is effective to prevent said first d.c. voltage signal from said voltage divider from causing said one input from being too negative relative to the other of said two inputs to cause the differential amplifier to provide an output signal and to allow said first d.c. signal voltage to cause said one input to be positive with respect to the other input to cause the differential amplifier to provide an output signal.

7. An improved semiconductor temperature control circuit according to claim 6 wherein said clamping circuit includes a diode and a voltage divider which provide said second voltage signal when the semiconductor temperature control circuit is energized, said diode connected between said voltage divider included in said clamping circuit and the one input of the differential amplifier to apply said second voltage signal supplied by said clamping circuit to the differential amplifier.

8. An improved semiconductor temperature control circuit according to claim 6 wherein said adjustable resistance includes a plurality of resistors connected in series plus one switch connected across at least one of said resistors for completion of a short circuit when closed and at least one other switch connected across a combination of said one of said resistors and at least one additional one of said resistors for completion of a short circuit when closed whereby with all of said switches open, all of said plurality of resistors determine a temperature control point for the control circuit with a different temperature control point being determined upon closure of each of said switches.

* * * * *

UNITED STATES PATENT AND TRADEMARK OFFICE
CERTIFICATE OF CORRECTION

PATENT NO. : 4,816,642
DATED : March 28, 1989
INVENTOR(S) : Richard L. Dennison

It is certified that error appears in the above-identified patent and that said Letters Patent is hereby corrected as shown below:

Column 2, line 7, correct "∅,000 ohm" to --100,000 ohm--.

Column 6, line 48, correct "ae" to --are--.

Signed and Sealed this

Twentieth Day of February, 1990

Attest:

JEFFREY M. SAMUELS

*Attesting Officer*    *Acting Commissioner of Patents and Trademarks*